(12) United States Patent
Notani

(10) Patent No.: US 7,257,541 B1
(45) Date of Patent: Aug. 14, 2007

(54) SYSTEM AND METHOD FOR PERFORMING A BUSINESS PROCESS IN A MULTI-ENTERPRISE, COLLABORATING NETWORK

(75) Inventor: Ranjit N. Notani, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/415,052

(22) Filed: Oct. 8, 1999

(51) Int. Cl.
*G06Q 99/00* (2006.01)

(52) U.S. Cl. .............................. 705/1; 705/64; 705/75
(58) Field of Classification Search ................ 707/202, 707/10, 103, 8, 1, 2, 3, 4; 714/15; 705/1, 705/64, 75; 709/229, 213, 217, 225
See application file for complete search history.

(56) References Cited

U.S. PATENT DOCUMENTS 5,812,981 A * 9/1998 Noguchi et al. ............... 705/1
5,911,776 A * 6/1999 Guck ........................ 709/217
5,974,425 A * 10/1999 Obermarck et al. ........ 707/202
6,038,603 A * 3/2000 Joseph ....................... 709/228
6,324,581 B1 * 11/2001 Xu et al. .................... 709/229
6,421,787 B1 * 7/2002 Slaughter ...................... 714/4

FOREIGN PATENT DOCUMENTS

JP  02004326583 A  * 11/2004

* cited by examiner

*Primary Examiner*—Pierre Eddy Elisca
(74) *Attorney, Agent, or Firm*—Booth Udall, PLC

(57) ABSTRACT

A system for performing a business process includes a first version of a business application executed by a first client to perform a particular business process and a second version of the business application executed by a second client to perform the business process, wherein the first client is coupled to the second client using a communication link. The first version of the business application is identified using a first version identifier and the second version of the business application is identified using a second version identifier. One of the first version of the business application and the second version of the business application is selected to initiate the business process based upon the first version identifier and the second version identifier.

38 Claims, 3 Drawing Sheets

SYSTEM AND METHOD FOR PERFORMING A BUSINESS PROCESS IN A MULTI-ENTERPRISE, COLLABORATING NETWORK

TECHNICAL FIELD OF THE INVENTION

This invention relates in general to data communication, and more particularly to a system for performing a business process using a business application in a multi-enterprise, collaborating network.

BACKGROUND OF THE INVENTION

Businesses rely on the electronic communication of information using communication links to perform business processes. In the past, for example, businesses have used Electronic Data Interchange (EDI) networks to buy, sell, and trade information and goods. EDI defines a set of business processes performed by software interfaces, translators, and mapping protocols that must adhere to strictly-defined EDI standards to communicate a business document from one business to another, Several national and international organizations oversee, maintain, and enhance these EDI standards.

The rate of change of business processes, however, is increasing due to such technology innovations as the Internet. The EDI solution to this problem has been to create multiple versions of its standards. Therefore, there is no one true standard for performing particular business processes, but rather a set of different standard versions. EDI defines no mechanism for how these multiple versions should interoperate.

One solution to this problem is the development of an entire industry directed to translating between the different versions of EDI. Translation is a particularly integral part of EDI operation. Translators describe the relationship between the data elements in the underlying business application and the EDI standards (ANSI X12, EDIFACT, and others) by interpreting the information and putting it into a standard EDI document format. A drawback to this approach is that each business must maintain a mapping from its internal system to the EDI standard with which it is sending and/or receiving messages from another business. Whenever a business upgrades to a new version of an EDI standard for performing particular business processes, all of its business partners are immediately affected and must immediately upgrade their translators. Therefore prior systems are not stable or scalable.

SUMMARY OF THE INVENTION

In accordance with the present invention, the disadvantages and problems associated with prior systems for performing business processes have been substantially reduced or eliminated.

In accordance with one embodiment of the present invention, a system for performing a business process includes a first version of a business application that is identified using a first version identifier and executed by a first client to perform a particular business process. A second version of the business application that is identified using a second version identifier and executed by a second client to perform the business process, wherein the second client is coupled to the first client using a communication link. The second version of the business application determines a selected one of the first version of the business application and the second version of the business application to initiate the business process based upon the first version identifier and the second version identifier.

Another embodiment of the present invention is a method for performing a business process that includes determining a first version identifier associated with a first version of a business application used by a first client to perform a business process. The method continues by determining a second version identifier associated with a second version of the business application used by a second client to perform the business process. The method concludes by determining a selected one of the first version of the business application and the second version of the business application to initiate the business process based upon the first version identifier and the second version identifier.

Technical advantages of the present invention include a business application that executes to perform a particular business process and that may be categorized using versions of varying degrees. Some versions of the business application are generally referred to as more robust, more advanced, or otherwise higher than other versions of the business application if they provide enhanced functionality or services in performing the associated business process. A particular advantage of the present invention is that higher level versions of a business application exhibit "backward compatibility" that allows them to understand, meaningfully interact with, or otherwise support lower level versions of the business application. For example, higher level versions of a business application can operate using files, message formats, protocols, data structures, commands, and other functionality associated with lower level versions of the business application. Therefore, higher level versions of a business application may exhibit backward compatibility by performing an associated business process according to the functionality of the lower level versions of the business application. A further technical advantage provided by the present invention is that the business applications exhibit "bidirectional executability" such that a particular business application may execute a business process that, from a business standpoint, it does not initiate itself.

Still further technical advantages of the present invention include a system for performing a business process in which a first client executes a first version of the business application to perform a business process and a second client coupled to the first client executes a second version of the business application to perform the business process. The client operating the higher level version of the business application is selected to execute the business process. By exhibiting backward compatibility and/or bidirectional executability the selected version of the business application performs the business process in a manner supported by the lower level version of the business application maintained by its partner client. In this respect, the business process is executed between clients maintaining different versions of the business application.

Another advantage provided by the present invention is that because the business applications exhibit bidirectional executability and backward compatibility, a particular client can upgrade the version of a particular business application without negatively impacting any other client in the system. As a result, the system is not in a constant state of change so that the system is stable with respect to time. Furthermore, the system can support many clients so that it is scalable in terms of size.

Other technical advantages are readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein.

DETAILED DESCRIPTION OF THE INVENTION

Figure 1:
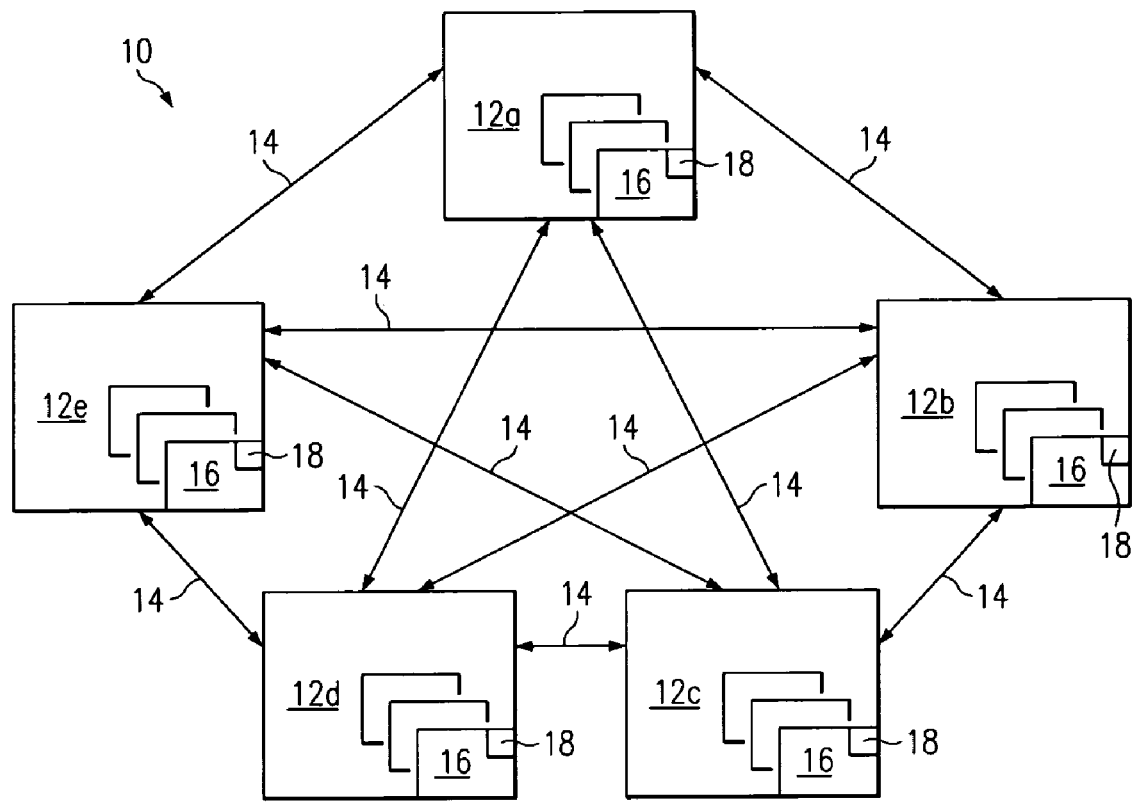
FIG. 1 illustrates a system for performing a business process according to the present invention.

FIG. 1 illustrates a system 10 for performing a business process that includes clients 12a-12e, generally referred to as clients 12, coupled to each other using communication links 14. Clients 12 perform particular business processes with each other using corresponding business applications 16 that may be categorized according to varying degrees of versions 18. In general, higher level versions 18 of business applications 16 may understand, meaningfully interact with, or otherwise support lower level versions 18 of business applications 16. In this respect, a higher level version 18 of a business application 16 can perform the associated business process according to the functionality of any lower level version 18 of the business application 16. Therefore, a first client 12 seeking to perform a particular business process with a second client 12 using a business application 16 determines which client 12 executes the particular business process using the higher level version 18 of the business application 16. The determined client 12 then performs the business process in a manner supported by the lower level version 18 of the business application 16.

Clients 12 comprise computers, workstations, or any other suitable combination of processing and memory devices that include the appropriate hardware and software capabilities to execute business applications 16. Clients 12 communicate with each other using hardware and software associated with links 14. For example, clients 12 couple to each other using communication devices that may include any combination of hubs, routers, bridges, gateways, firewalls, switches, remote access devices, or any other association of suitable communication devices and related software that facilitate communication among clients 12 using links 14. Although FIG. 1 illustrates clients 12a-12e, it should be understood that system 10 may include any number and combination of clients 12. Clients 12 perform particular business processes with other clients 12, generally referred to as partner clients 12, using the appropriate business applications 16.

A business process comprises any transaction between clients 12 that involves the exchange of information using a business application 16. Although the following description of system 10 is detailed with reference to a particular type of business process, such as an "Order Purchasing" business process, it should be understood that system 10 supports any appropriate type of business process in any suitable business industry. For example, system 10 supports business processes in the consumer goods manufacturing industry (e.g., order purchasing, accounting, procurement, shipping, delivery, replenishment, inventory management, marketing automation, and supply chain integration); the distribution industry (e.g., tracking, shipping, and routing); the financial services industry (e.g., electronic funds transfer, electronic payment systems, security systems); and any suitable type of business process in any other business industry.

Each link 14 may be a dedicated or switched link over the public switched telephone network (PSTN), a satellite link, a microwave link, or any other appropriate communication link between clients 12. The components of system 10 may be part of a local area network (LAN), a wide area network (WAN), a virtual private network (VPN), or any other suitable arrangement of interconnected computing devices that form a multi-enterprise, collaborating network. In a particular embodiment, clients 12 in system 10 communicate over the Internet using the worldwide web (WWW), file transfer protocol (FTP), or any other communication technique. For example, clients 12 may maintain and execute a browser or other suitable program for accessing and communicating information addressed by a uniform resource locator (URL) using links 14.

Each business application 16 comprises a software computer program written in any suitable computer language that may be compiled based on the instructions of a selected computer operating system associated with a corresponding client 12. Business applications 16 are described in greater detail with reference to FIG. 2. In general, each business application 16 executes to perform a particular business process and may be categorized using versions 18. Some versions 18 of a particular business application 16 are generally referred to as more robust, more advanced, or otherwise higher than other versions 18 of the business application 16 if they provide enhanced functionality or services in performing the associated business process. The particular versions 18 of a business application 16 may be indicated using version identifiers.

A particular advantage of system 10 is that higher level versions 18 of a business application 16 exhibit "backward compatibility" that allows them to understand, meaningfully interact with, or otherwise support lower level versions 18 of the business application 16. For example, higher level versions 18 of a business application 16 can operate using files, message formats, protocols, data structures, commands, and other functionality associated with lower level version 18 of business application 16. Therefore, higher level versions 18 of a business application 16 may exhibit backward compatibility by performing an associated business process according to the functionality of the lower level versions 18 of the business application 16. Although business applications 16 support backward compatibility, it should be understood that whether a particular version 18 of a business application 16 actually executes backward compatibility is based in part upon, for example, the versions 18 of the business application 16 maintained by its partner clients.

Clients 12 of system 10 may perform different activities depending upon the particular business process to be executed. For example, during the execution of a order purchasing business process, respective clients 12 may perform buyer and/or seller activities, and are therefore generally referred to as buyer clients 12 and seller clients 12. A further technical advantage provided by system 10 is that business applications 16 exhibit "bidirectional executability" such that a particular business application 16 may execute a business process that, from a business standpoint, it does not initiate itself. For example, a portion of the order purchasing business process may involve a buyer client 12 communicating a purchase order to a seller client 12. From a business standpoint, this business process is initiated by the buyer client 12, so that the buyer client 12 may be referred to as a "business initiator." However, the higher level version 18 of business application 16 may execute the order purchasing business process even if it is maintained by a seller client 12 rather than by the buyer client 12 that is the business initiator. Although business applications 16 support bidirectional executability, it should be understood that whether a particular version 18 of business application 16 exhibits bidirectional executability is based in part upon, for example, whether the client 12 maintaining the business application 16 is the business initiator for the particular business process.

In operation, clients 12 execute business applications 16 to perform one or more business processes in system 10. Although the following description of FIG. 1 is detailed with respect to a first client 12 and a second client 12, it should be understood that the business processes may be executed by any appropriate number and combination of clients 12 in system 10. A first client 12, such as a business initiator seeking to perform a particular business process with a second client 12, determines which client 12 maintains a higher level version 18 of the appropriate business application 16 used to execute the business process. In one embodiment, the first client 12 communicates a request to identify the version 18 of the business application 16 maintained by the second client 12. In another embodiment, the first client 12 stores information identifying the version 18 of the appropriate business application 16 maintained by each of its partner clients 12, such as the second client 12, to perform the particular business process. This information may be validated by each partner client 12 for a predetermined duration of time during which the version 18 of the business application 16 will not change.

The client 12 having the higher level version 18 of the appropriate business application 16 exhibits "backward compatibility" and/or "bidirectional executability" to execute the particular business process with the other client 12. In particular, the client 12 having the higher level version 18 of the business application 16 performs the particular business process in a manner supported by the lower level version 18 of the business application 16 maintained by its partner client 12. In this respect, the business process is executed between clients 12 maintaining different versions 18 of the business application 16.

A problem with prior systems using EDI, for example, is that businesses employing different versions of EDI standards to perform a business process must maintain a mapping from these internal systems to the EDI standard with which they are sending and/or receiving messages from other businesses. Whenever a particular business upgrades to a new version of an EDI standard for performing particular business processes, all of its business partners are immediately affected and must immediately upgrade their translators. A technical advantage provided by system 10 is that because business applications 16 support "bidirectional executability" and "backward compatibility," a particular client 12 can upgrade the version 18 of a particular business application 16 without negatively impacting any other client 12 in system 10.

Referring to FIG. 1 to illustrate an example of this advantage, client 12a performs a particular business process using a first version 18 of an appropriate business application 16. The first version 18 of business application 16 may comprise the lowest level version 18 maintained by any of clients 12 with which client 12a performs the indicated business process. Clients 12b, 12c, and 12d execute the business process using a second version 18 of the appropriate business application 16 that is a higher version than that maintained by client 12a. Furthermore, client 12e performs the business process using a third version of business application 16 that is a higher version 18 than those maintained by any of clients 12a-12d.

In this example, if client 12c is a business initiator seeking to perform the business process with client 12a, client 12c determines that it maintains the higher level version 18 of the appropriate business application 16. As a result, client 12c exercises control in executing the business process with client 12a according to the functionality of the lower level version 18 of the business application 16 maintained by client 12a.

If client 12c is a business initiator seeking to perform the business process with either of clients 12b or 12d, client 12c determines that it maintains the same version 18 of business application 16 as clients 12b and 12d. In this situation, the business application 16 of business initiator, such as client 12c, generally executes the business process and therefore does not exhibit bidirectional executability in this particular situation. Furthermore, because the versions 18 of business application 16 are the same among clients 12b, 12d, and 12c, the business application 16 of client 12c does not exhibit backward compatibility in this particular situation.

If client 12c is a business initiator seeking to perform the business process with client 12e, client 12c determines that client 12e maintains the higher level version 18 of business application 16. As a result, client 12e exercises control in executing the business process according to the functionality of the lower level version 18 of the business application 16 maintained by client 12c. In each of the above-identified arrangements of partner clients 12, the business process is executed in a manner supported by the business applications 16 of each client 12 irregardless of the particular version 18 maintained by any given client 12.

Assuming now that client 12c upgrades its version 18 of business application 16 from the second version 18 to a fourth version 18 that is a higher version than those maintained by clients 12a, 12b, 12d, or 12e. Client 12c now maintains the highest level version 18 of business application 16 among its partner clients 12. Previously, clients 12b and 12d maintained the same version 18 of business application 16 as client 12c. However, clients 12b and 12d now maintain lower versions 18 of business application 16 than client 12c. Therefore, system 10 grants control to client 12c to initiate and execute the business process with either of clients 12b or 12d according to the functionality of the lower level version 18 of the business application 16 maintained by clients 12b and 12d. Previously, client 12e maintained a higher version 18 of business application 16 than client 12c. The situation is now reversed. In particular, because client 12c maintains a fourth version 18 of business application 16 and client 12e maintains a third version 18 of business application 16, client 12c receives control to execute the business process according to the lower level version 18 of the business application 16 maintained by client 12e. The situation between clients 12c and 12a remains unchanged because client 12c still maintains a higher level version 18 of business application 16 than client 12a.

None of clients 12a, 12b, 12d, or 12e are impacted by the upgrade of business application 16 by client 12c. In particular, none of clients 12a, 12b, 12d, or 12e need to upgrade their respective business applications 16 in order to perform a business process with client 12c even though client 12c upgraded its version 18 from a second version 18 to a fourth version 18 of business application 16. This is because client 12c executes the business process with respect to each of clients 12a, 12b, 12d, and 12e, and because business application 16 of client 12 exhibits backward compatibility that allows it to execute the business process according to the functionality of any lower level versions 18 of the business application 16, such as the business applications 16 of clients 12a, 12b, 12d, and 12e.

Even if client 12c is not the "business initiator" of the business process, the business application 16 of client 12c can still execute the business process because it supports bidirectional executability. Business applications 16 of clients 12b, 12d, and 12e may operate differently after the upgrade of business application 16 by client 12c because the control of the business process is no longer with them, but they do not need to be upgraded, or modified in any manner, in order to perform the business process with client 12c. Because a particular client 12 of system 10 may upgrade the version 18 of a particular business application 16 without negatively affecting any of its partner clients 12, system 10 is stable and scaleable. In particular, system 10 is not in a constant state of change so that system 10 is stable with respect to time. Furthermore, system 10 can support many clients 12 so that it is scaleable in terms of size. Moreover, many clients 12 provide back-end integration of business applications 16 to systems such as inventory, planning, ERP, and financial systems. The use of business applications 16 allows these systems to be preserved because business applications 16 may also be backward compatible with these systems. In this respect the back-end systems are generally shielded from upgrades to business applications 16.

Figure 2:
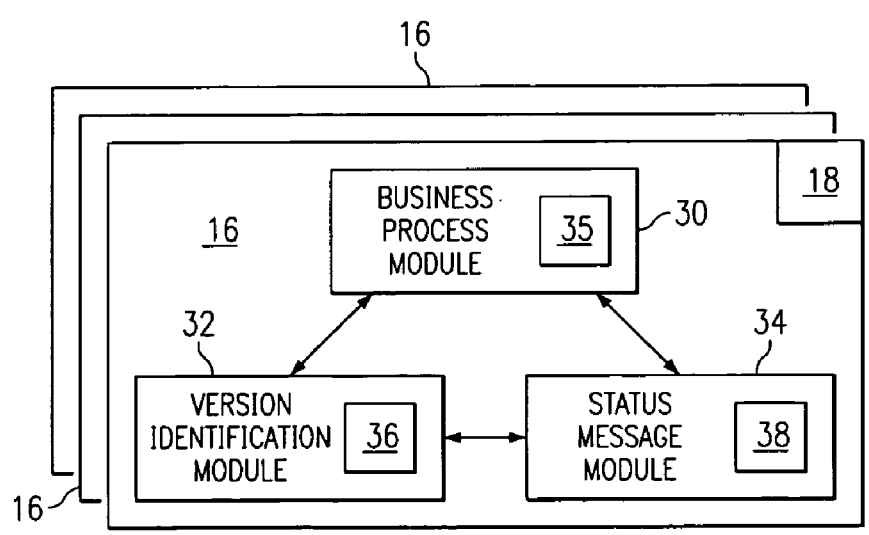
FIG. 2 illustrates one embodiment of a business application of the system.

FIG. 2 illustrates business application 16 in more detail. A business application 16 comprises a business process module 30 coupled to a version identification module 32 and a status message module 34. Business process module 30 includes software code, parameters, protocols, and other instructions and data structures that execute to perform the business process associated with the particular business application 16. For example, business process module 30 generates and/or communicates business messages 35 to perform the business process. Business messages 35 comprise request messages, response messages, or any other type of communication between clients 12 to facilitate the execution of a business process. Business messages 35 may be generated in a manner supported by lower level versions 18 of the business application 16. In this respect, the features and functions of business process module 30 may be enhanced, increased, or otherwise upgraded with each version 18 of a particular business application 16. The business process module 30 supports the backward compatibility and bidirectional executability described above with reference to the business application 16.

Version identification module 32 comprises software code, parameters, protocols, and other instructions and data structures that execute to determine which client 12 among a group of partner clients 12 maintains a higher level version 18 of a particular business application 16 used to perform a particular business process. In one embodiment, version identification module 32 may generate a version identification request 36 for communication to one or more partner clients 12. A version identification request 36 comprises a request for information identifying the version 18 of a particular business application 16. Module 32 generates the version identification request 36 according to a version identification protocol that configures the request 36 in a format supported by any version 18 of the appropriate business application 16. In this respect, version identification modules 32 remain unchanged among varying degrees of versions 18 for a particular business application 16.

Status message module 34 comprises software codes, parameters, protocols and other instructions and data structures that execute to generate a status message 38 for communication to one or more partner clients 12. Status messages 38 comprise information indicating the presence of a business message 35 associated with the business process. Status message module 34 generates the status message 38 according to a status message protocol that configures status message 38 in a format supported by any version 18 of the appropriate business application 16. In this respect, status message modules 34 remain unchanged among varying degrees of versions 18 for the appropriate business application 16.

Figure 3A:
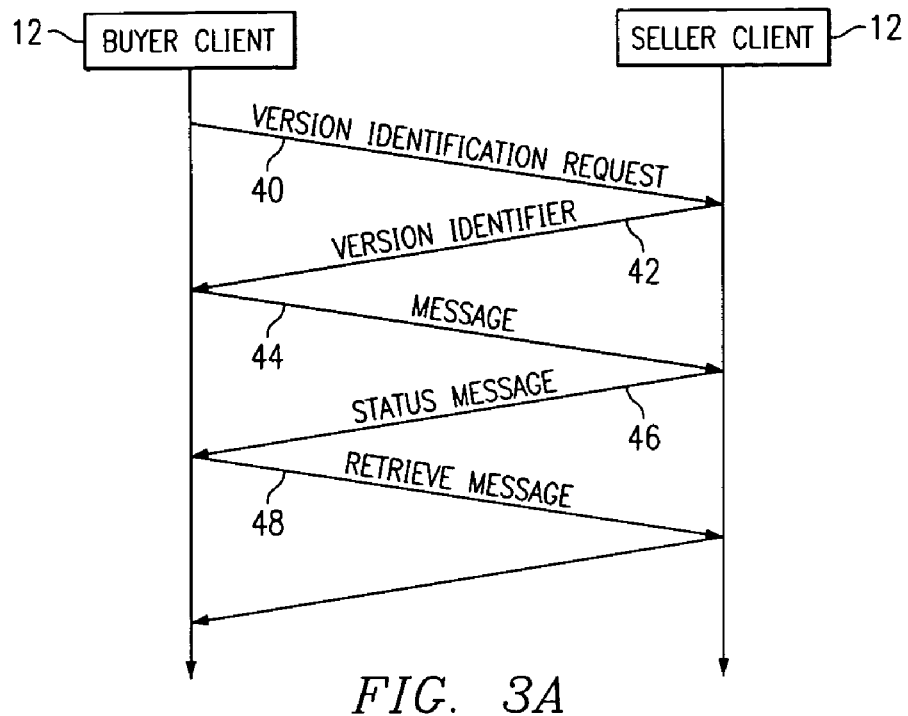
FIGS. 3A and 3B illustrate exemplary communications between different clients of the system to perform a business process according to the present invention.
Figure 3B:
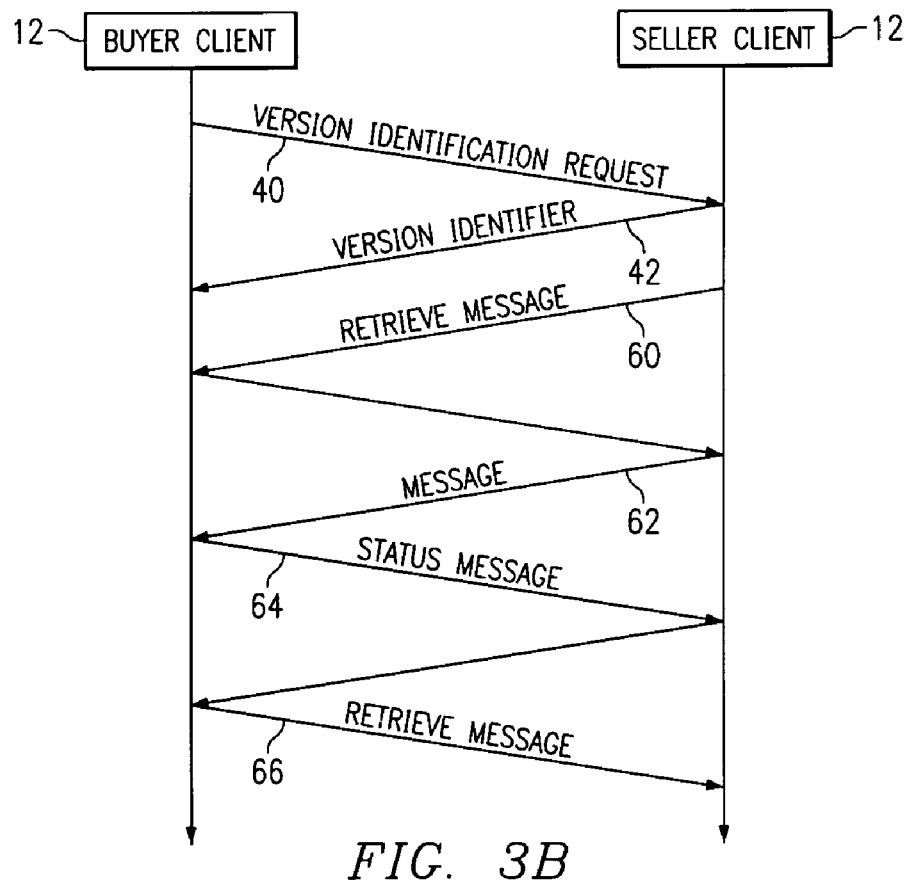

FIGS. 3A and 3B illustrate exemplary communications between different clients 12 of system 10 to perform a business process. Although the description of FIGS. 3A and 3B is detailed with respect to a buyer client 12 and a seller client 12 performing an order purchasing business process, it should be understood that the features and functions of system 10 support any suitable business process among any number and combination of clients 12. The business initiator of the business process, such as buyer client 12, communicates a version identification request 36 to the seller client 12 at 40. Version identification module 32 of the appropriate business application 16 for buyer client 12 generates version identification request 36 according to the version identification protocol supported by all versions 18 of the business application 16. Seller client 12 communicates a version identifier at 42 in response to the version identification request 36 to indicate the version 18 of the business application 16 maintained by seller client 12 to perform the order purchasing business process.

Upon determining the version 18 of the business application 16 maintained by seller client 12 based upon the communication by seller client 12 at 42 or, in one embodiment, according to version identifiers stored locally, buyer client 12 determines one of buyer client 12 and seller client 12 to initiate the business process. Business process module 30 of the appropriate business application 16 for buyer client 12 selects buyer client 12 to execute the business process if the version 18 of business application 16 for seller client 12 is not higher than the version 18 of business application 16 for buyer client 12. FIG. 3A illustrates an example of buyer client 12 maintaining a higher level version 18 of business application 16 than seller client 12. FIG. 3B illustrates an example of seller client 12 maintaining a higher level version 18 of business application 16 than buyer client 12.

Referring back to FIG. 3A, buyer client 12 communicates to seller client 12 a business message 35, such as a purchase order associated with the order purchasing business process, at 44. Business process module 30 of business application 16 for buyer client 12 generates the business message 35 according to the version 18 of business application 16 maintained by seller client 12. In this regard, business application 16 for buyer client 12 exhibits backward compatibility with business application 16 of seller client 12 to perform the business process.

Seller client 12 communicates a status message 38 to buyer client 12 at 46 to indicate the presence of a business message 35 associated with the business process. The status message module 34 of the appropriate business application 16 maintained by seller client 12 generates the status message 38 according to a status message protocol that is supported by all versions 18 of the business application 16. The status message 38 essentially indicates to buyer client 12 that a business message 35 is pending for it at seller client 12. A technical advantage provided by the status message 38 is that it eliminates the need for buyer client 12 to repeatedly poll seller client 12 in order to detect the availability of pending messages 35. The status message 38 communicated by seller client 12 to buyer client 12 at 46 is associated with an identifier for the business process for which the business message is pending. Therefore, in a order purchasing business process performed by client 12, the status message 38 may indicate the presence of a business message 35, such as an acknowledgment to the purchase order, associated with an identifier of the order purchasing business process.

In response to receiving a status message 38 at 46, buyer client 12 retrieves the appropriate business message 35 from seller client 12 at 48. Business process module 30 of the application 16 maintained by buyer client 12 generally retrieves a business message 35 at 48 using commands, data structures, message formats, and other functionality according to the lower level version 18 of business application 16 maintained by seller client 12. Further communications may be made by buyer client 12 and/or seller client 12 to complete the appropriate business process in a manner similar to the communications described above with reference to FIG. 3A.

FIG. 3B illustrates another example of the communications made by buyer client 12 and seller client 12 while performing the order purchasing business process described above with reference to FIG. 3A. More specifically, FIG. 3B illustrates communications made between buyer client 12 and seller client 12 where buyer client 12 determines that seller client 12 maintains a higher level version 18 of the appropriate business application 16 based upon the version identification request 36 communicated at 40 and the version identifier received by buyer client 12 at 42. Therefore, seller client 12 maintains control over the execution of the business process.

The version identification request 36 communicated by buyer client 12 at 40 indicates to seller client 12 that buyer client 12 has generated a business message associated with the order purchasing business process. Seller client 12 retrieves the business message 35 from buyer client 12 at 60 using the commands, data structures, message formats and functionality associated with the lower level version 18 of the business application 16 maintained by buyer client 12. In this respect, the business application 16 of seller client 12 exhibits backward compatibility to communicate seamlessly with lower level versions 18 of business application 16. The business message 35 retrieved by seller client 12 performing the order purchasing business process may comprise a purchase order generated by buyer client 12.

Seller client 12 generates and communicates a business message 35, such as an acknowledgment to the purchase order, at 62 according to the lower level version 18 of business application 16 maintained by buyer client 12. Buyer client 12 communicates a status message 38 to seller client 12 at 64 to indicate the presence of a business message 35 associated with the business process, such as a response to the seller client 12 acknowledgment. Status message module 34 of business application 16 for buyer client 12 generates the status message 38 according to the status message protocol supported by all versions 18 of business application 16. In response to receiving the status message 38 at 64, seller client 12 retrieves the business message 35 generated by buyer client 12 at 66 using functionality associated with the lower level version 18 of business application 16 maintained by buyer client 12.

A technical advantage associated with system 10 is that although buyer client 12 is the business initiator in the order purchasing business process illustrated in FIG. 3B, the seller client 12 exhibits bidirectional executability to control the execution of the business process, and further exhibits backward compatibility to perform the business process according to the functionality of the lower level version 18 of business application 16 maintained by buyer client 12.

Figure 4:
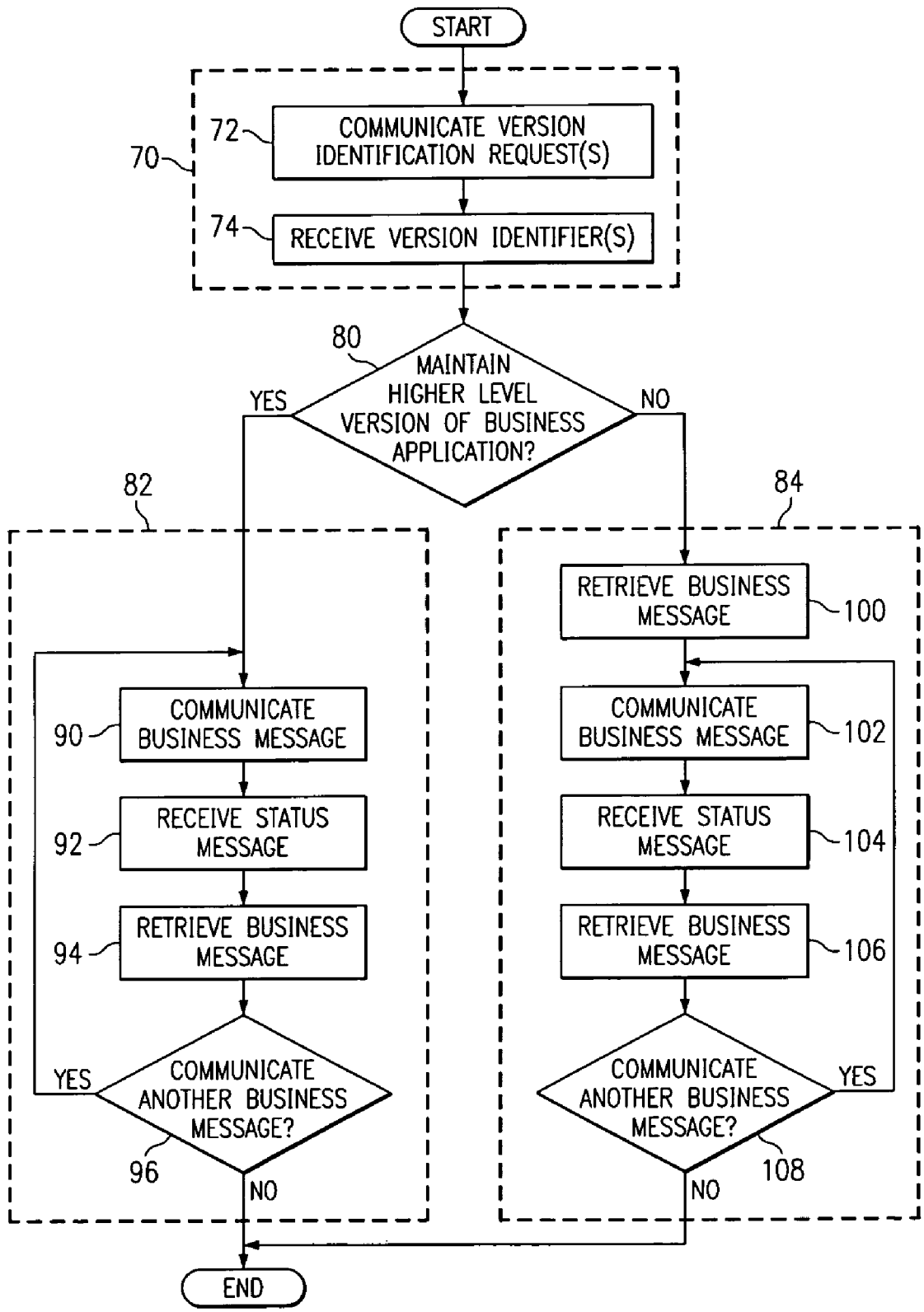
FIG. 4 is a flowchart of an exemplary method for performing a business process according to the present invention.

FIG. 4 is a flowchart of an exemplary method for performing a business process according to the present invention. The method begins at steps 70 where a first client 12, such as a business initiator, performs an inquiry of partner clients 12 to determine the versions 18 of the business applications 16 maintained by the partner clients 12 for the particular business process to be executed. In particular, the first client 12 communicates to each of its partner clients 12 a version identification request 36 associated with the particular business process, at step 72. Although the first client 12 may perform the business process with any number and combination of partner clients 12, the following description of FIG. 4 will be detailed with respect to a first client 12 and a second client 12. The first client 12 receives a version identifier from the second client 12 at step 74. The version identifier indicates the version 18 of the business application 16 maintained by the second client 12 to perform the identified business process.

The first client 12 determines whether it maintains the higher level version 18 of the appropriate business application 16 at step 80. If so, execution proceeds to steps 82 where the first client 12 executes the business process according to the functionality of the lower level version 18 of the business application 16 maintained by the second client 12. If the first client 12 does not maintain the higher level version 18 of the business application 16 as determined at step 80, execution proceeds to steps 84 where the second client 12 executes the business process according to the functionality of the lower level version 18 of the business application 16 maintained by the first client 12.

Referring to steps 82, the first client 12 communicates to the second client 12 a business message 35 at step 90. The business application 16 of the first client 12 exhibits backward compatibility to generate the business message 35 according to the functionality of the lower level version 18 of the business application 16 maintained by the second client 12. The first client 12 receives a status message 38 at step 92 indicating the presence of a business message 35 generated by the second client 12 in response to the business message 35 communicated by the first client 12 at step 90. The status message 38 received at step 92 is generated according to a status message protocol supported by all versions 18 of the appropriate business application 16. The first client 12 retrieves the business message 35 generated by the second client 12, at step 94, using commands, data structures, message formats, and functionality associated with the lower level version 18 of business application 16 maintained by the second client 12. The first client 12 determines whether to communicate another business message 35 at step 96. If so, execution returns to step 90. If not, execution terminates at step 110.

Referring to steps 84, the second client 12 retrieves a business message 35 from the first client 12 at step 100 in response to the inquiry performed by the first client 12 at steps 70. Second client 12 retrieves the business message 35 from the first client 12 using commands, data structures, message formats, and functionality associated with the lower level version 18 of the business application 16 maintained by the first client 12. In this respect, the business application 16 of the second client 12 exhibits both bidirectional executability and backward compatibility. The second client 12 communicates a business message 35 to the first client 12 at step 102 and receives a status message at step 104 indicating the presence of a business message 35 generated by the first client 12 according to the status message protocol supported by all versions 18 of the business application 16. The second client 12 retrieves the business message 35 generated by the first client 12 at step 106 according to the functionality associated with the lower level version 18 of business application 16 maintained by the first client 12. The second client 12 determines whether to communicate another business message 35 at step 108. If so, execution returns to step 102. If not, execution terminates at step 110.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A computer-implemented system for performing a business process comprising one or more processing units and one or more memory units, the system comprising:
   a first version of a business application identified using a first version identifier and executable by a first client to perform the business process, the first client being coupled to a second client using a communication link, a second version of the business application identified using a second version identifier being executable by the second client to perform the business process;
   the first version of the business application operable to determine the first version identifier and the second version identifier and, if the first version is higher than the second version, to exercise control over execution of the business process;
   the first version of the business application operable to allow the second version of the business application to exercise control over execution of the business process if the second version is higher than the first version,
   wherein the first version of the business application comprises a version identification module operable to generate a version identification request for communication to the second client, the version identification request being associated with the business process and generated according to a version identification protocol supported by the first version of the business application and the second version of the business application, a version identification module of the second version of the business application initiating communication of the second version identifier to the first version of the business application in response to the version identification request.

2. The system of claim 1, wherein the first version of the business application is operable, if the first version of the business application is an initiator of the business process, to control the business process if the second version is not higher than the first version.

3. The system of claim 1, wherein the first version of the business application further comprises a business process module operable to:
   generate a first business message associated with the business process for communication to the second client, the first business message being generated according to the second version; and
   initiate retrieval from the second client of a second business message generated according to the second version.

4. The system of claim 1, wherein the first client is operable to receive a status message from the second client indicating the presence of a business message associated with the business process at the second client, the status message being generated according to a status message protocol supported by the first version of the business application and the second version of the business application.

5. The system of claim 1, wherein the first version of the business application further comprises a business process module operable to generate a business message associated with the business process for retrieval by the second client, the business message being generated according to the first version.

6. The system of claim 1, wherein the first version of the business application further comprises a status message module operable to generate a status message for communication to the second client to indicate the presence of a business message associated with the business process at the first client, the status message being generated according to a status message protocol supported by the first version of the business application and the second version of the business application.

7. The system of claim 1, wherein the first version is higher than the second version if the first version is one or more of:
   more robust than the second version;
   more advanced than the second version; and
   capable of providing enhanced functionality or services, relative to the second version, in performing the business process.

8. The system of claim 1, wherein the first version of the business application exhibits backward compatibility with the second version of the business application, the first version of the business application being capable of performing the business process according to either the first version or the second version.

9. The system of claim 1, wherein the first business application of the first client can be upgraded from the first version to a higher version without negatively impacting any other clients in the system.

10. The system of claim 1, wherein the first and second versions of the business application each exhibit bidirectional executability in that each can execute a business process that it did not itself initiate.

11. The system of claim 1, wherein:
    the first client is associated with a buyer enterprise;
    the second client is associated with a seller enterprise;
    the business process comprises an order purchasing business process; the first business message comprises a purchase order; and
    the second business message comprises a purchase order acknowledgement.

12. A method for performing a business process, comprising:
    at a first client, determining a first version identifier associated with a first version of a business application used by the first client to perform the business process;
    at the first client, determining a second version identifier associated with a second version of the business application used by a second client to perform the business process;

at the first client, exercising control over execution of the business process if the first version is higher than the second version; and at the first client, allowing the second version of the business application to exercise control over execution of the business process if the second version is higher than the first version, further comprising communicating a status message from the first client to the second client according to a status message protocol supported by the first version of the business application and the second version of the business application, the status message indicating the presence of a business message associated with the business process at the first client.

13. The method of claim 12, further comprising:
generating a version identification request for communication from the first client to the second client; and
receiving the second version identifier from the second client in response to the version identification request.

14. The method of claim 13, wherein the version identification request is generated according to a version identification protocol that is supported by the first version of the business application and the second version of the business application.

15. The method of claim 12, further comprising, if the first version of the business application is an initiator of the business process, controlling the business process at the first client if the second version is not higher than the first version.

16. The method of claim 12, further comprising:
generating a first business message associated with the business process for communication from the first client to the second client, the first business message being generated according to the second version; and
retrieving from the second client a second business message generated by the second client according to the second version.

17. The method of claim 12, further comprising:
at the first client, receiving a status message generated by the second client according to a status message protocol that is supported by the first version of the business application and the second version of the business application, the status message indicating the presence of a business message associated with the business process at the second client; and
retrieving the business message from the second client in response to the status message.

18. The method of claim 12, further comprising generating at the first client a business message associated with the business process for retrieval by the second client, the business message being generated according to the second version.

19. The method of claim 12, further comprising:
performing the business process according to the first version if the second version is higher than the first version; and
performing the business process according to the second version if the first version is higher than the second version.

20. The method of claim 12, wherein the first version is higher than the second version if the first version is one or more of:
more robust than the second version;
more advanced than the second version; and
capable of providing enhanced functionality or services, relative to the second version, in performing the business process.

21. The method of claim 12, wherein the first version of the business application exhibits backward compatibility with the second version of the business application, the first version of the business application being capable of performing the business process according to either the first version or the second version.

22. The method of claim 12, wherein the first business application of the first client can be upgraded from the first version to a higher version without negatively impacting any other clients in the system.

23. The method of claim 12, wherein the first and second versions of the business application each exhibit bidirectional executability in that each can execute a business process that it did not itself initiate.

24. The method of claim 12, wherein:
the first client is associated with a buyer enterprise;
the second client is associated with a seller enterprise;
the business process comprises an order purchasing business process; the first business message comprises a purchase order; and
the second business message comprises a purchase order acknowledgement.

25. Software for performing a business process, the software being encoded on a computer-readable medium and when executed operable to:
at a first client, determine a first version identifier associated with a first version of a business application used by the first client to perform the business process;
at the first client, determine a second version identifier associated with a second version of the business application used by a second client to perform the business process;
at the first client, exercise control over execution of the business process if the first version is higher than the second version; and
at the first client, allow the second version of the business application to exercise control over execution of the business process if the second version is higher than the first version,
wherein the first version of the business application exhibits backward compatibility with the second version of the business application, the first version of the business application being capable of performing the business process according to either the first version or the second version.

26. The software of claim 25, further operable to:
generate a version identification request for communication from the first client to the second client; and
receive the second version identifier from the second client in response to the version identification request.

27. The software of claim 26, wherein the version identification request is generated according to a version identification protocol that is supported by the first version of the business application and the second version of the business application.

28. The software of claim 25, further operable to, if the first version of the business application is an initiator of the business process, control the business process at the first client if the second version is not higher than the first version.

29. The software of claim 25, further operable to:
generate a first business message associated with the business process for communication from the first client to the second client, the first business message being generated according to the second version; and retrieve from the second client a second business message generated by the second client according to the second version.

30. The software of claim 25, further operable to:

at the first client, receive a status message generated by the second client according to a status message protocol that is supported by the first version of the business application and the second version of the business application, the status message indicating the presence of a business message associated with the business process at the second client; and retrieve the business message from the second client in response to the status message.

31. The software of claim 25, further operable to generate at the first client a business message associated with the business process for retrieval by the second client, the business message being generated according to the second version.

32. The software of claim 25, further operable to communicate a status message from the first client to the second client according to a status message protocol supported by the first version of the business application and the second version of the business application, the status message indicating the presence of a business message associated with the business process at the first client.

33. The software of claim 25, further operable to:

perform the business process according to the first version if the second version is higher than the first version; and perform the business process according to the second version if the first version is higher than the second version.

34. The software of claim 25, wherein the first version is higher than the second version if the first version is one or more of:

more robust than the second version;

more advanced than the second version; and capable of providing enhanced functionality or services, relative to the second version, in performing the business process.

35. The software of claim 25, wherein the first business application of the first client can be upgraded from the first version to a higher version without negatively impacting any other clients in the system.

36. The software of claim 25, wherein the first and second versions of the business application each exhibit bidirectional executability in that each can execute a business process that it did not itself initiate.

37. The software of claim 25, wherein:

the first client is associated with a buyer enterprise;

the second client is associated with a seller enterprise;

the business process comprises an order purchasing business process;

the first business message comprises a purchase order; and the second business message comprises a purchase order acknowledgement.

38. A computer-implemented system for performing a business, process comprising one or more processing units and one or more memory units, the system comprising:

means for, at a first client, determining a first version identifier associated with a first version of a business application used by the first client to perform the business process;

means for, at the first client, determining a second version identifier associated with a second version of the business application used by a second client to perform the business process; and means for, at the first client, exercising control over execution of the business process if the first version is higher than the second version;

means for, at the first client, allowing the second version of the business application to exercise control over execution of the business process if the second version is higher than the first version; and means for communicating a status message from the first client to the second client according to a status message protocol supported by the first version of the business application and the second version of the business application, the status message indicating the presence of a business message associated with the business process at the first client.

* * * * *